Feb. 22, 1944.  F. F. BRUECKNER  2,342,246
CUTTING OFF MACHINE
Filed Jan. 6, 1943  4 Sheets-Sheet 1

INVENTOR
Frederick F. Brueckner
BY Harness, Dickey & Pierce
ATTORNEYS.

Feb. 22, 1944.  F. F. BRUECKNER  2,342,246
CUTTING OFF MACHINE
Filed Jan. 6, 1943  4 Sheets-Sheet 2
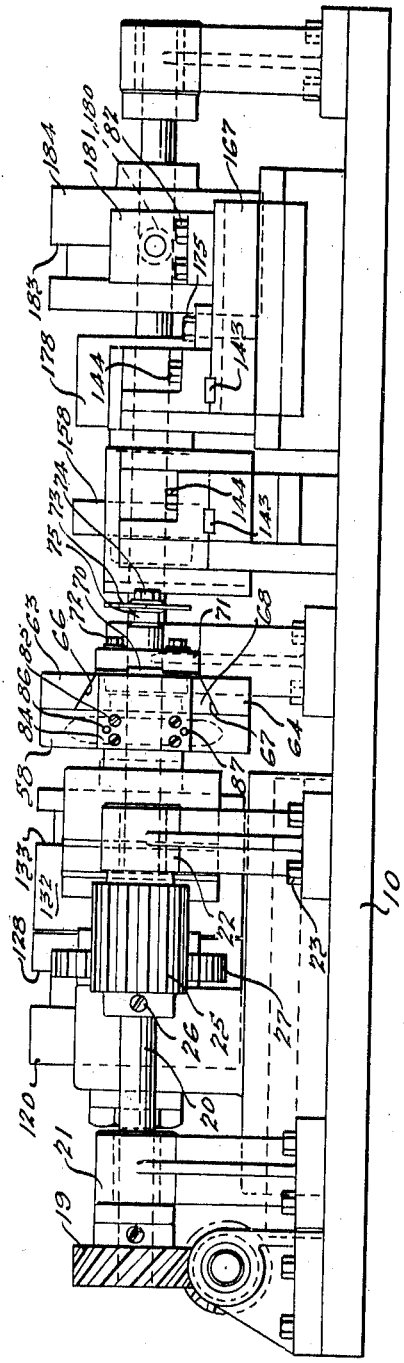
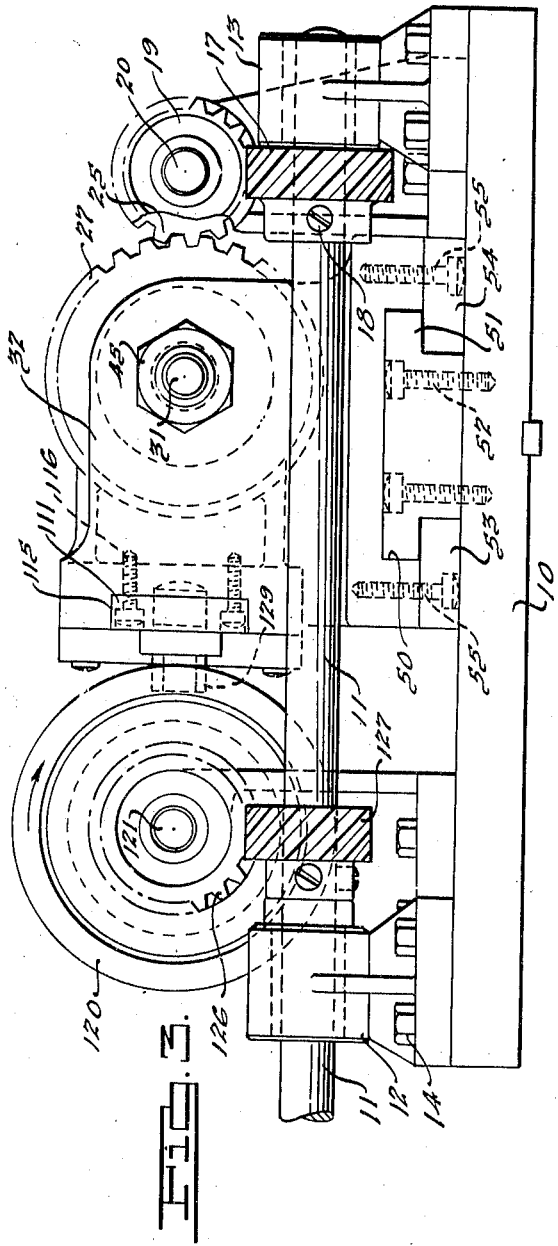
INVENTOR
Frederick F. Brueckner.
BY Harness, Dickey & Pierce.
ATTORNEYS.

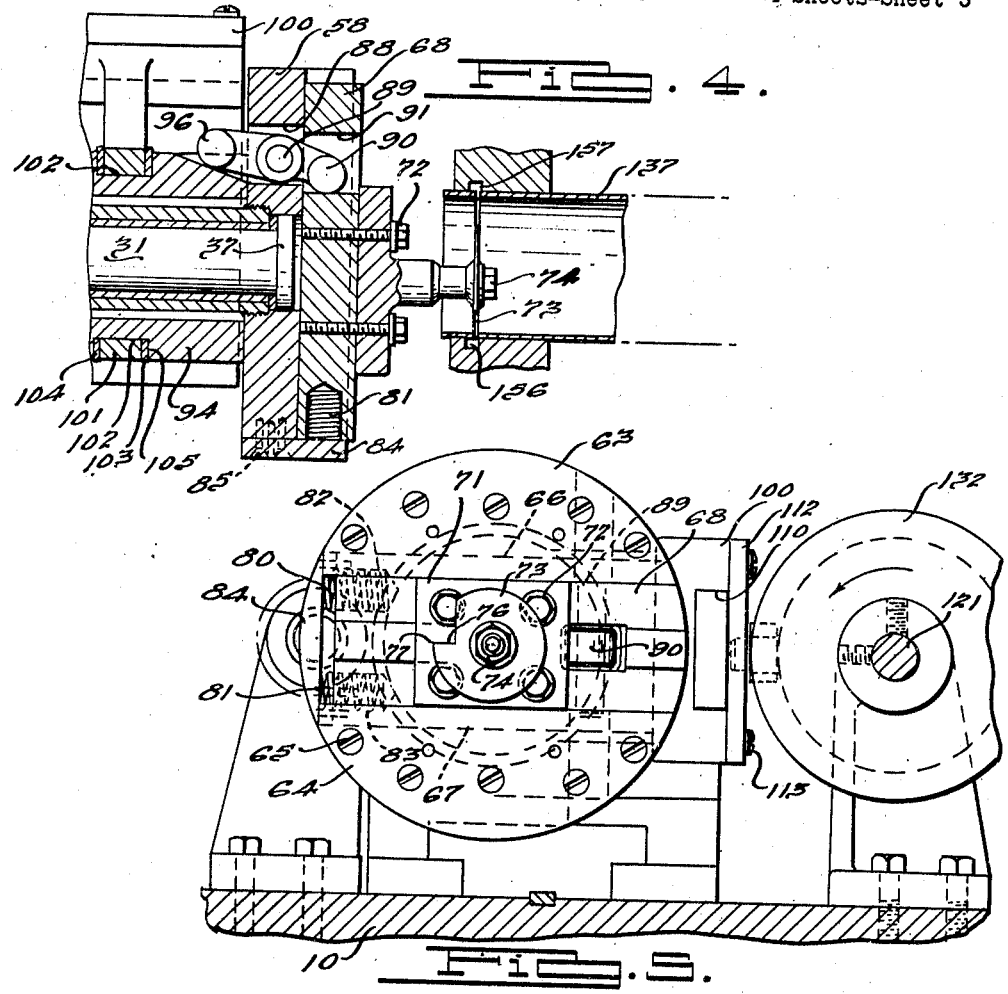

Feb. 22, 1944.     F. F. BRUECKNER     2,342,246
CUTTING OFF MACHINE
Filed Jan. 6, 1943     4 Sheets-Sheet 4
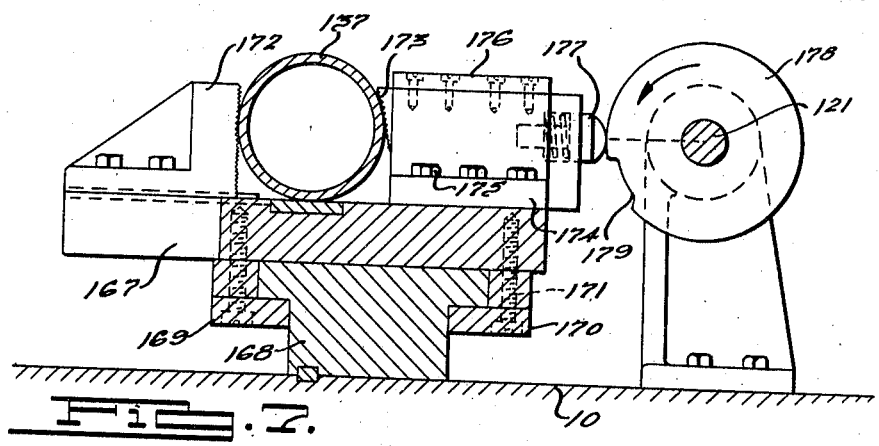
FIG. 7.
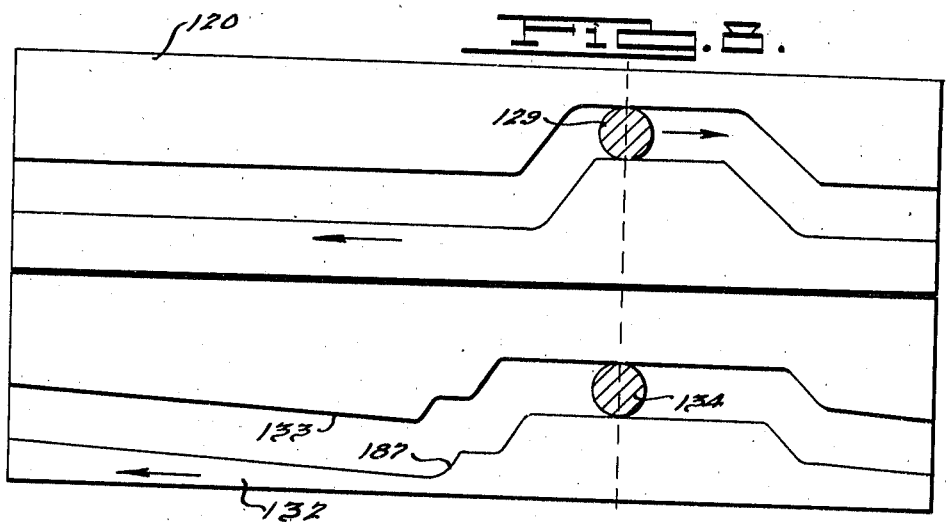
FIG. 8.
FIG. 9.
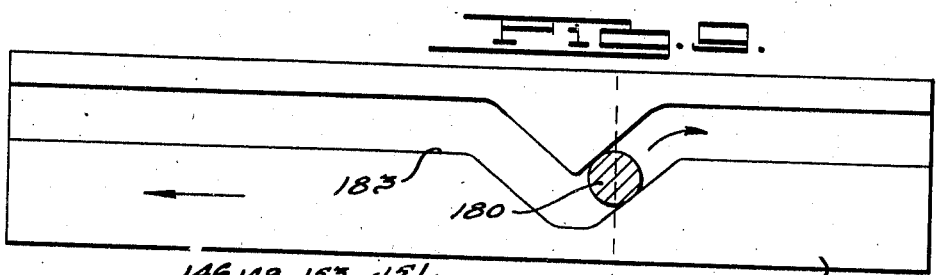
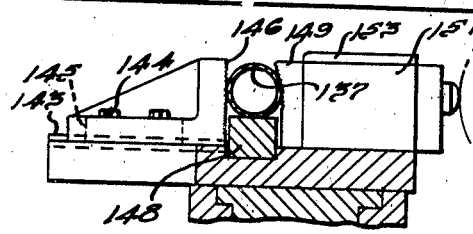
FIG. 10.
INVENTOR
Frederick F. Brueckner.
BY
Harness, Dickey & Pierce.
ATTORNEYS Patented Feb. 22, 1944

2,342,246

UNITED STATES PATENT OFFICE 2,342,246

CUTTING-OFF MACHINE

Frederick F. Brueckner, Detroit, Mich., assignor to William R. Wilson, Detroit, Mich.

Application January 6, 1943, Serial No. 471,400

13 Claims. (Cl. 164—62)

The invention relates to metal cutting machines and it has particular relation to a machine for cutting metal bands from a metal tube.

In the manufacture of metal bands adapted for use on gun shells, it is usual practice to cut the tube inwardly from the outside and, as a result of this procedure, it is very difficult to avoid leaving burrs along the inner edges at both ends of the band. Since these bands are applied in grooves formed in the shells, it is quite important that the inner surface of the band be free from such burrs so as to obtain a close, smooth surface fit with the bottom of the shell groove and avoid the possibility of gas leakage past the band. Accordingly, when the tube is cut inwardly from the outside, additional operations must be performed on the band after it is grooved in order to remove the burrs.

On the other hand, it is not so undesirable to have burrs at the outer side of the band for the reason that the band when applied is usually shrunk into the groove and then the outer surface is machined in order to obtain the final, accurate outside diameter. This final machining operation necessarily would remove any burrs on the outer side of the band.

Various types of machines may be used in cutting bands from a tube, such as hand operated machines of various types, and certain types of automatic screw machines. While machines of the latter type may be employed for cutting bands from a tube, ordinarily the machine is large, requires considerable space, and in general is not efficient for band cutting operations. Comparatively speaking, a machine of the automatic screw type is more efficient for work generally done on automatic screw machines and if used for cutting bands from a tube, full and efficient use of the machine is not obtained.

While hand-operated machines have been used for cutting bands, one principal objection, aside from the burr factor, is that the machines are not efficient and the volume of production is small. This necessarily increases the cost and at the present time when the volume of bands needed is considerable, improvements which would simplify manufacturing operations, increase production, and therefore decrease cost, are decidedly important.

One object of the present invention is to provide a shell band cutting machine which will automatically and efficiently cut the bands from the tube in successive and automatic operations through cutting of the tube outwardly from the inside.

Another object of the invention is to provide a shell band cutting machine of the character indicated which will allow for adjustments so that bands may be cut from tubes of varying diameters and wall thicknesses.

Another object of the invention is to provide an automatic shell band cutting machine which is very small so that its cost of manufacture will be minimized and so that very little space will be required for accommodating it.

Other objects of the invention will become apparent from the following specification, from the drawings relating thereto, and from the claims hereinafter set forth.

Figure 2 is a side elevational view of the machine shown by Figure 1;

Figure 3 is an end view of the machine shown by Figure 1;

Figure 4 is a detail view on a larger scale of that portion of the mechanism located in the dotted circle X of Figure 1;

Figure 5 is a cross-sectional view taken substantially along the line 5—5 of Figure 1;

Figure 6 is a cross-sectional view taken substantially along the line 6—6 of Figure 1;

Figure 7 is a cross-sectional view taken substantially along the line 7—7 of Figure 1;

Figure 8 is a layout view illustrating one of the cams;

Figure 9 is a similar layout view illustrating another cam in the machine; and

Figure 10 is a modified view illustrating another form of means for gripping the tube.

Figure 1:
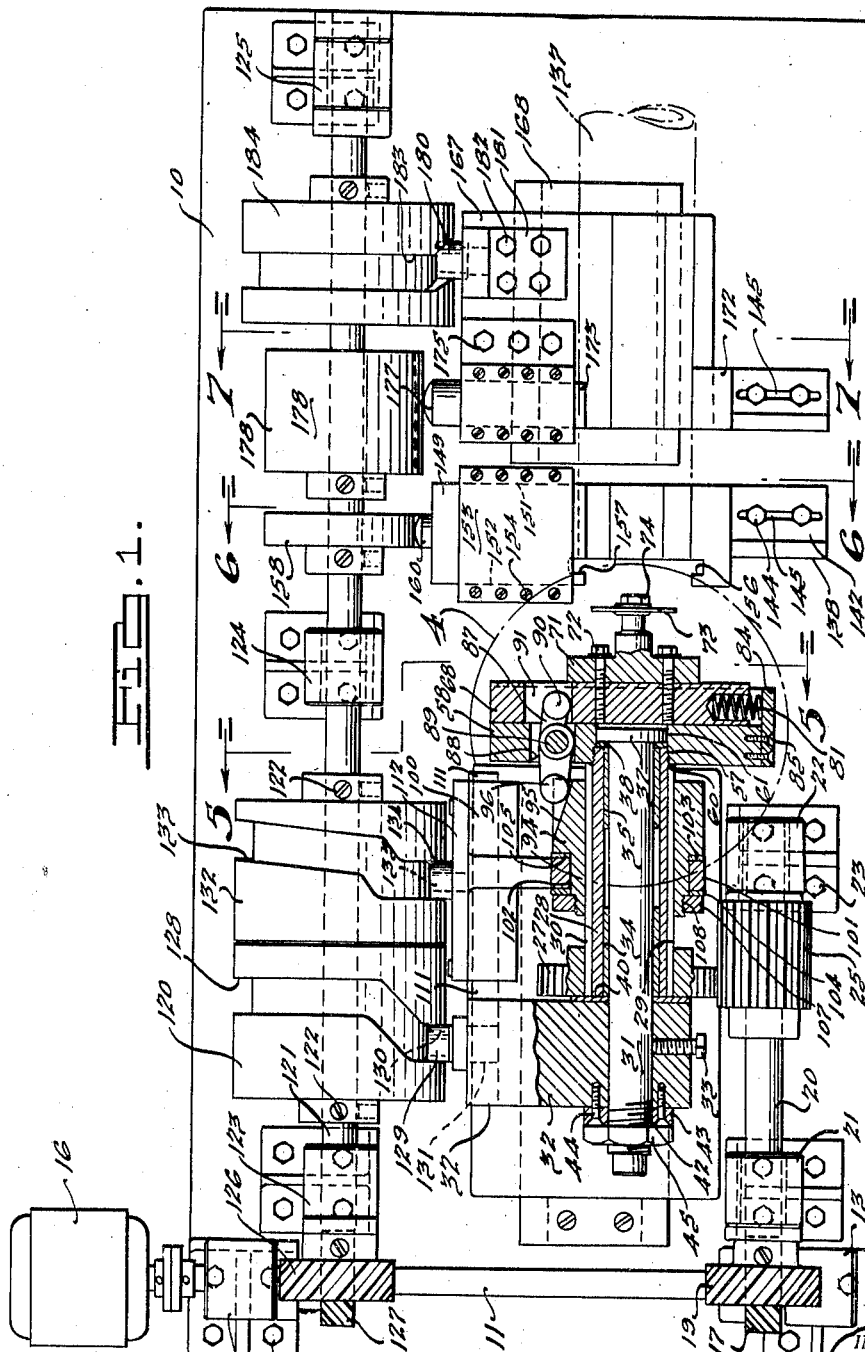
Figure 1 is a plan view of a shell band cutting machine constructed according to one form of the invention.

Referring to Figures 1, 2 and 3, the machine has a base 10 upon which substantially all parts are supported and at one end, as seen in Figure 2, a driving shaft 11 is journalled in bearings 12 and 13 fastened to the base such as by machine bolts 14. As illustrated in Figure 1, a motor 16 may be connected to one end of the shaft 11 for driving it. Adjacent the bearing 13, a spiral gear 17 is drivingly secured to the shaft 11 by means of a set screw 18 and this gear meshes with a spiral gear 19 which is similarly secured to a cross shaft 20.

As best shown by Figures 1 and 2, the cross shaft 20 is rotatably supported in spaced bearings 21 and 22 which are secured to the base 10 by machine bolts 23. Still referring to Figures 1 and 2 in particular, a relatively long gear 25 is fastened by a set screw 26 to the shaft 20 adjacent the bearing 22, and this gear meshes with a gear 27. The latter is keyed to the sleeve 28 by means of diametrically opposed keys 29 and 30 which so fit keyways in both the gear and sleeve that normally the gear is held against axial movement on the sleeve. The sleeve is rotatable on a pin 31 secured in a slide 32 by means of a set screw 33 and in order to provide a good bearing between the sleeve and pin, bearing sleeves 34 and 35 are disposed between the sleeve 28 and the pin and are sufficiently press fitted on the pin so as to maintain their axial positions shown while permitting the sleeve 28 to rotate on their outer bearing surfaces. The sleeve 28 and pin 31 are retained in assembled relation by a head 37 on the end of the pin opposite the slide 32 and this head engages a bearing washer 38, which, in turn, has bearing contact with the end of the sleeve 28.

At the opposite end of the sleeve 28, a second bearing washer 40 is provided between the side wall of the gear 27 and the slide 32. The pin 31 at its end opposite the head 37 projects from the slide 32 and has a threaded portion 42 which is threaded into a collar 43 fastened to the slide by means of screws 44. A lock nut 45 on the end of the sleeve locks the pin rigidly to the slide 32.

Now referring to Figure 3, the slide 32 is slidably mounted on the base 10 by means of a channelway 50 receiving the T-portion of a guideway 51 fastened to the base 10 by screws 52. For holding the slide on the guideway, side plates 53 and 54 fastened to the slide by means of screws 55 overlap the side portions of the guideway.

From the description so far given now, it should be understood that the slide 32 may move along the guideway 51, and that during this movement the gear 27 will remain in engagement with the driving gear 25 due to the length of the latter.

Referring now to Figures 1, 4, and 5 in particular, the end of the sleeve 28 adjacent the head 37 on the pin 31 is threaded into a central opening 57 of a disc or head 58 and for rigidly holding these parts connected, the sleeve and disc are welded around the end of the opening in the disc as indicated at 60. It may be noted that the opening in the disc has a smooth or cylindrical portion 61 which receives the washer 38 and head 37 on the pin, although it is to be understood that the disc can rotate freely with respect to the head.

As best shown by Figures 2 and 5, the head 58 has a slideway on its axially outer side and this slideway is formed by means of plates 63 and 64 which are secured to the disc by means of screws 65. Adjacent, tapered edges 66 and 67 on the plates 63 and 64, respectively, retain a cross slide 68 having similarly shaped edges, and this cross slide is so disposed as to move diametrically of the axis of rotation. At its center, the cross slide 68 has a key or rib 70 which fits a corresponding recess in a cutterhead 71 secured to the cross slide by means of screws 72. The key or rib 70 serves as a driving connection between the cross slide and cutterhead so as to avoid torque driving loads on the screws 72. The cutterhead at its outer side has a pin portion 75 on which a cutter 73 is secured by means of a nut 74.

As best shown by Figure 5, the cutter 73 is notched out at one point as indicated at 76 to provide a cutter edge or tooth 77. It will be appreciated that the angularity of the notch readily allows sharpening of the cutting edge and that the amount of material in the cutter permits repeated sharpenings, thereby providing long life for the cutter.

As best shown by Figures 1, 2, 4, and 5, the cross slide 68 is urged radially in one direction by a pair of coil springs 80 and 81 located in openings 82 and 83 in the cross slide and which have their outer ends abutting a cap 84 secured to the disc 58 by screws 85. Dowel pins 86 and 87 at circumferentially opposed edges of the cap 84 positively locate it in proper position.

Movement of the cross slide 68 in the opposite radial direction, that is, against the action of the springs 80 and 81, is effected by means of an arm 87 extending through a slot 88 in the disc 58 and which is pivoted in such slot on a pin 89 disposed in a transversely extending opening in the disc. This arm has a rounded end 90 projecting into a larger slot 91 in the cross slide 68 and from this it follows that if the arm is pivoted in one direction about the axis of pin 89, the cross slide will move radially against the action of the springs whereas, if the arm is allowed to move in the opposite direction, the springs will move the cross slide in the opposite radial direction.

For moving the arm 87 in a direction opposing the action of the springs 80 and 81, referring now to Figures 1 and 4, collar 94 is slidable on the sleeve 28 and has keyways receiving the keys 29 and 30, so that the collar rotates with the sleeve while being slidable thereon. This collar has a notch at one point provided with a tapered seat 95 and this seat engages a rounded end 96 at the end of the arm 87 opposite the end 90. It will be apparent that when the collar 94 shifts to the right, the arm 87 will pivot in such manner as to move the cross slide 68 against the action of the springs 80 and 81. The collar 94 is adapted to be moved by a slide 100 having a central ring portion 101 which rotatably embraces a cylindrical portion 102 of the collar 94. Bearing washers 103 and 104 are disposed at opposite sides of the ring and the washer 103 is maintained substantially against a shoulder 105 at one end of the cylindrical portion 103 by a nut 107 threaded on a smaller end 108 of the collar and which substantially contacts the washer 104.

As best shown by Figures 1 and 5, the slide 100 has a channel shaped groove 110 which slidably receives a bar 111. A plate 112 secured to the slide by screws 113 closes the open side of the channel so as to provide a rectangular opening substantially but slidably fitting the bar.

With particular reference now to Figures 1 and 2, the bar 111 extends into and seats in a channel shaped slot 115 in the slide 32. Screws 116 rigidly secure the bar to the slide, and from this it follows that the slide 100 is held against rotation about the axis of the sleeve 28 by its sliding engagement with the bar.

For advancing the cutter 73 axially so as to move it into a tube to be cut, a cam 120 is provided and this cam is secured to a shaft 121 by set screws 122. The shaft 121 is journaled in spaced bearings 123, 124 and 125 secured by screws to the base 10 and that end of the shaft adjacent the shaft 11 has a spiral gear 126 which meshes with the spiral gear 127 fixed on the shaft 11 so that rotation of the latter causes rotation of the shaft 121.

The cam 120 has a cam groove 128 which cooperates with a cam roller 129 rotatable on a stud 130 which has a threaded end 131 threaded into the bar 111. It may be briefly stated at this point that as the cam 120 rotates, the slide 32 will be advanced so as to move the cutter into the tube and then no axial motion of the cutter will occur for a predetermined length of time and then the cam and cam groove will effect axial withdrawal of the cutter from the tube.

For moving the cutter radially, or, in other words, for moving the slide 100 against the action of the springs 80 and 81, a second cam 132 having a cam groove 133 is similarly secured to the shaft and the groove co-operates with a roller 134 mounted on a stud 135 which is secured to the plate 112. The contour of the groove 133 is such that after advance of the cutter into the tube, the cutter will be gradually moved in a radially outward direction so as to cut through the wall of the tube and sever a band therefrom. After the cutting action, the cutter is withdrawn radially and this occurs prior to axial withdrawal of the cutter. Further reference with respect to the action of these parts of the machine will be made presently.

Now referring to Figures 1 and 6, means for supporting a tube 137 to be successively cut comprises a supporting block 138 embracing a T-shaped slideway 139 and which is slidably retained on the latter by side plates 140 and 141 secured by screws 142 to the block. This block at its upper side has an angle member 142 slidable thereon and guided by a key 143 and for adjustably holding the member in position, bolts 144 passing through an elongated slot 145 in the member are threaded into the block. A vertical serrated surface 146 on the member is adapted to engage the tube. At its lower side, the tube rests on a bar insert 147, and by changing the height or thickness of the insert and the position of member 142, the position of the pipe may be varied and this is desirable particularly where different diameters of pipe are to be cut. Figure 10 shows a modification of this character where the insert indicated at 148 is substantially thicker and it will be noted that the tube in this case may be substantially smaller in diameter without substantially changing the location of the axial center line.

For clamping the tube in the position shown, a slidable element 149 is provided and this element has a tapered, serrated surface 150 adapted to contact the tube. The element slides on the upper surface of the block 138 and is guided between vertical portions 151 and 152 (see Figure 1) of the block while a plate 153 secured by screws 154 to such portions holds the element in position while permitting its lateral sliding. It might be noted at this point that both the member 142 and the element 149 have vertical slots indicated at 156 and 157, respectively, and these slots permit the cutter to go through the tube without interference at the outer side of the tube.

The element 149 is moved towards the tube by a cam 158 secured to the shaft 121 and this cam engages a cam follower 160 slidable in an opening 161 in the element 149 and which has a smaller extension 162 slidable in a smaller opening 163 in the element. A compressed spring 164 is provided in the larger opening 161 between the cam follower and the element, although, under certain circumstances, it might be desired to have the cam follower solid with the element. The major portion of the cam surface is adapted to hold the element clamped against the tube but a relief 165 in the cam acts to release the clamping pressure so that the tube may be axially advanced. It is to be observed in connection with Figure 1 in particular that this tube clamping means will hold the tube at both sides of the notches 156 and 157 so that during the cutting operation, the band being cut off is also held.

After the tube is cut and the cutter is withdrawn radially, the tube is advanced axially a definite amount preparatory to a successive cutting operation, and for accomplishing this advancing of the tube, cam actuated means are employed which will now be described. This means generally includes a slide 167 shown by Figures 1 and 7 which is slidably mounted on a T-shaped slideway 168 and is retained thereon by side plates 169 and 170 secured in turn to the slide by screws 171. Clamping means similar to that already described includes a clamping element 172 similar to the clamping element 142 and a clamping element 173 slidable in a bracket 174 having a channel portion receiving such element 173. Screws 175 hold the bracket on the slide and a plate 176 closes the upper side of the channel. Movement of the element 173 is effected by a cam follower 177 engaging a cam 178 secured to the shaft 121. It might be mentioned here that the cam 178 has a relief 179 to allow release of the clamping means at a predetermined time.

Axial movement of the slide 167 is effected by means of a cam roller 180 fastened to the upright part of an angular element 181 fastened by bolts 182 to the slide 167. This roller engages a groove 183 in a roller 184 fastened to the shaft 121.

Figures 6, 7, and 9 generally show the relation of the two cams operating the two tube clamping means and the cam 134 which cooperates with the roller 189. The relation of these cams is such that during the cutting operation, both clamping means hold the tube and the cam roller 180 is moving through the straight part of the cam groove 183. As soon as the cutting operation is completed, the clamping means actuated by cam 178 releases and at the same time the cam groove 183 and roller 180 act to shift the slide 167 to the right as seen in Figure 1.

When the cam roller 180 reaches the bottom of this jog in the cam groove, the second clamping means again acts to clamp the tube and at the same time the first clamping means releases. Then, as the roller 180 moves along the opposite incline in the jog 185 in the groove, the tube is advanced a definite and predetermined amount preparatory to cutting the second band from the end of the tube. The cut-off band in the meantime is pushed out and falls vertically below the first clamping means and thus the tube can move into position for the second cutting operation. It might be mentioned here that the block 138 is suitably open below the band being cut off so as to allow it to fall out and into a receptacle or chute.

The entire operation is synchronized and while perhaps already generally understood, the total operation will now be briefly set forth.

With the tube in position clamped by both tube clamping means, the cam roller 129 in groove 128 acts to advance the cutter into the tube a predetermined amount. After the cutter has been advanced into the tube, the second cam 134 acts to advance the cutter radially in a gradual manner so as to effect the cutting operation. As soon as the cutter has cut through the wall of the tube, the springs 80 and 81 retract the cutter radially and it might be mentioned at this point with reference to Figure 9 that the cam groove 133 has a relief 187 to allow the springs to quickly retract the cutter to a point where it will at least clear the inner surface of the tube. As soon as the cutter is thus retracted, it begins to withdraw axially from the tube. At the same time, the clamping means operated by the cam 178 releases and cam 184 acts to move the slide 167 to the right as seen in Figure 1 a predetermined distance, and then the cam 178 operates to again cause the second clamping means to engage the tube. Just before the slide 167 begins to shift to the left, the cam 158 acts to release its clamping means so as to allow advancing of the tube and dropping of the cut-off band out of the machine. Then the tube is advanced to its new position and after completion of the advance, the cam 158 causes the first clamping means to again clamp the tube preparatory for a second cutting operation. In the meantime, the cutter withdraws axially from the tube and returns following advance of the tube. It will be observed generally that once a tube is inserted in the machine, bands will be automatically and rapidly cut from the tube and that the cutting operation is effected from the inside outwardly.

Various cams, cutter heads, and other parts such as the inserts 145 and 148, may be employed for varying the length of band cut and for adjusting the mechanism to accommodate different diameters of tubes. Altogether, it should be apparent that the different parts of the mechanism may be adjusted or that parts may be changed as mentioned, so that tubes varying in diameter may be accommodated and so that bands of varying lengths and varying diameters may be produced.

Although only one form of the invention has been illustrated and described in detail, it will be apparent to those skilled in the art that various modifications may be made without departing from the scope of the appended claims.

What is claimed is:

1. A machine for successively cutting bands from a tube by cutting outwardly from the inside thereof, a rotary cutter, means for rotating the cutter, automatically operating means for advancing the cutter axially into the end of the tube and after a predetermined time axially withdrawing the cutter from the tube, automatically operating means acting during said predetermined time to move the cutter radially outwardly so as to cut through the tube and then to retract the cutter, means for holding the tube, and automatically operating means for advancing the tube following each cutting operation.

2. A machine for successively cutting bands from a tube by cutting outwardly from the inside thereof, a rotary cutter, means for rotating the cutter, automatically operating means for advancing the cutter axially into the end of the tube and after a predetermined time axially withdrawing the cutter from the tube, automatically operating means acting during said predetermined time to move the cutter radially outwardly so as to cut through the tube and then to retract the cutter, and automatically operating means for holding the tube and cut-off band until the cutter is withdrawn from the band and then releasing the band.

3. A machine for successively cutting bands from a tube by cutting outwardly from the inside thereof, a rotary cutter, means for rotating the cutter, automatically operating means for advancing the cutter axially into the end of the tube and after a predetermined time axially withdrawing the cutter from the tube, automatically operating means acting during said predetermined time to move the cutter radially outwardly so as to cut through the tube and then to retract the cutter, and means automatically operable for holding the tube and cut-off band until the cutter is withdrawn from the band, then releasing the band, and then for advancing the tube a predetermined amount preparatory to the next cutting operation.

4. A machine for successively cutting bands from a tube by cutting outwardly from the inside thereof, a rotary cutter, means for rotating the cutter, automatically operating means for advancing the cutter axially into the end of the tube and after a predetermined time axially withdrawing the cutter from the tube, automatically operating means acting during said predetermined time to move the cutter radially outwardly so as to cut through the tube and then to retract the cutter, means automatically operable for gripping the tube during the band cutting operation and for releasing it after such operation, and means automatically operable for advancing the tube between band cutting operations.

5. A machine for successively cutting bands from a tube by cutting outwardly from the inside thereof, a rotary cutter, means for rotating the cutter, automatically operating means for advancing the cutter axially into the end of the tube and after a predetermined time axially withdrawing the cutter from the tube, automatically operating means acting during said predetermined time to move the cutter radially outwardly so as to cut through the tube and then to retract the cutter, means operable for gripping the end portion of the tube including the band to be cut off, means including tube gripping means for advancing the tube after release of the first gripping means and after release of the cut-off band, and means automatically governing the gripping and tube advancing means so that they operate in sequence and in synchronism to the operation and movements of the cutter.

6. A machine for successively cutting bands from a tube by cutting radially outwardly from the inside thereof, comprising means for holding the tube, a rotary cutter, means for rotating the cutter, cam actuated means for advancing the cutter axially into the tube and withdrawing it axially after a predetermined time, and cam actuated means operating after such advance of the cutter into the tube for moving the cutter radially outwardly to effect the cutting operation on the tube and then for moving the cutter inwardly to retracted position, the last mentioned cam means being of such character as to effect slow, progressive outward movement of the cutter to effect cutting of the band and then to effect rapid retraction movement of the cutter.

7. A machine for successively cutting bands from a tube by cutting radially outwardly from the inside thereof, comprising means for holding the tube, a rotary cutter, means for rotating the cutter, cam actuated means for advancing the cutter axially into the tube and withdrawing it axially after a predetermined time, means for moving the cutter radially outwardly and for retracting it inwardly, and means controlled by the axial position of the cam actuated mean for determining the initial radially outward movement of the cutter.

8. A machine for successively cutting bands from a tube by cutting radially outwardly from the inside thereof, comprising means for holding the tube, a slide, a rotary cutter mounted on the slide and being radially movable thereon, means for rotating the cutter, cam operated means for moving the slide so as to advance the cutter into the tube, a second slide on the first slide, means on the second slide for effecting radial outward movement of the cutter depending upon relative movement of the slides in one direction, and cam means for effecting the movement of the second slide in said one direction relative to the first slide.

9. A machine for successively cutting bands from a tube by cutting radially outwardly from the inside thereof, comprising means for holding the tube, a slide, a rotary cutter mounted on the slide and being radially movable thereon, means for rotating the cutter, cam operated means for moving the slide so as to advance the cutter into the tube, a second slide on the first slide, means on the second slide for effecting radial outward movement of the cutter depending upon relative movement of the slides in one direction, cam means for effecting movement of the second slide in said one direction relative to the first slide so as to cause outward movement of the cutter, spring means for retracting the cutter inwardly after the band cutting operation, and means on the last mentioned cam means for releasing the second slide for reversed movement by the spring means after the cutter has completed its outward cutting movement.

10. A machine for successively cutting bands from a tube by cutting radially outwardly from the inside thereof, comprising means for holding the tube, a slide having a pin projecting therefrom, a tubular, rotary sleeve on the pin, means for rotating the sleeve while permitting its movement with the slide along the axis of the sleeve, a head on one end of the sleeve, a cutter, means mounting the cutter on the head so that it can be moved radially inwardly and outwardly, spring means on the head for moving the cutter in one radial direction, a collar rotatable with and slidable on the sleeve, cooperating means on the head and collar for effecting radial movement of the cutter in the other radial direction when the collar moves along the sleeve in one direction, cam means for moving the first slide so as to advance the cutter axially into the tube, and cam operated means for moving the collar so as to move the cutter radially against the action of the spring means after the cutter advances into the tube.

11. A machine for successively cutting bands from a tube by cutting radially outwardly from the inside thereof, comprising means for holding the tube, a slide having a pin projecting therefrom, a tubular, rotary sleeve on the pin, means for rotating the sleeve while permitting its movement with the slide along the axis of the sleeve, a head on one end of the sleeve, a cutter, means mounting the cutter on the head so that it can be moved radially inwardly and outwardly, spring means on the head for moving the cutter in one radial direction, a collar rotatable with and slidable on the sleeve, cooperating means on the head and collar for effecting radial movement of the cutter in the other radial direction when the collar moves along the sleeve in one direction, a second slide, means operatively connecting the collar and second slide to permit rotation of the latter while it is axially moved by such slide, cam means for moving the first slide so as to advance the cutter axially into the tube, and cam means for moving the second slide so as to move the cutter radially against the action of the spring means after the cutter advances into the tube.

12. A machine for successively cutting bands from a tubular member by cutting outwardly from the inside thereof, a cutter member, means for rotating one member about the axis of the tubular member, automatically operating means for moving one member along said axis and relative to the other member first to advance the cutter member into the end of the tubular member and then after a predetermined time to retract the cutter member from the tubular member, automatically operating means for shifting one member relative to the other radially of said axis between the advance and retraction of the cutter member so as to effect outward cutting off of a band from the tubular member and then inward withdrawal of the cutter member, and means for axially advancing the tubular member a predetermined amount after each cutting operation so as to enable cutting successive bands from the tubular member.

13. A machine for successively cutting bands from a tubular member by cutting outwardly from the inside thereof, a cutter member, means for rotating one member about the axis of the tubular member, automatically operating means for moving one member along said axis and relative to the other member first to advance the cutter member into the end of the tubular member and then after a predetermined time to retract the cutter member from the tubular member, automatically operating means for shifting one member relative to the other radially of said axis between the advance and retraction of the cutter member so as to effect outward cutting off of a band from the tubular member and then inward withdrawal of the cutter member, means for holding the cut-off band during the cutting operation and during axial retraction of the cutter member and then releasing the band prior to the next advance of the cutter member, and means for axially advancing the tubular member a predetermined amount after each cutting operation so as to enable cutting successive bands from the tubular member.

FREDERICK F. BRUECKNER.